(12) United States Patent
Bromfield et al.

(10) Patent No.: US 11,944,984 B2
(45) Date of Patent: Apr. 2, 2024

(54) ADAPTIVE CONTROL OF INDUSTRIAL AUTOMATION FOR MINING FLOTATION CELLS

(71) Applicant: Rockwell Automation Technologies, Inc., Mayfield Heights, OH (US)

(72) Inventors: Scotty Bromfield, Johannesburg (ZA); Corey A. Peterson, Grafton, WI (US); Timothy L. Stanford, Mequon, WI (US); David C. Mazur, Mequon, WI (US); Steven Clohessy, Johannesburg (ZA); Pieter Wolmarans, Johannesburg (ZA); Rob A. Entzminger, Lenexa, KS (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 887 days.

(21) Appl. No.: 16/578,742

(22) Filed: Sep. 23, 2019

(65) Prior Publication Data

US 2021/0086198 A1 Mar. 25, 2021

(51) Int. Cl.
*B03D 1/02* (2006.01)
*G05B 13/02* (2006.01)
*G05B 13/04* (2006.01)

(52) U.S. Cl.
CPC ......... *B03D 1/028* (2013.01); *G05B 13/0265* (2013.01); *G05B 13/041* (2013.01); *B03D 2203/02* (2013.01)

(58) Field of Classification Search
CPC ...... B03D 1/028; B03D 2203/02; B03D 1/16; B03D 1/24; B03D 1/02; G05B 13/0265; G05B 13/041; G05B 11/36; G05B 11/42
See application file for complete search history.

(56) References Cited

U.S. PATENT DOCUMENTS 6,778,881 B1 * 8/2004 Du Plessis ............. B03D 1/028
700/265
8,511,378 B2 * 8/2013 Parsche ............... E21B 43/2401
166/302

(Continued)

FOREIGN PATENT DOCUMENTS

CN 206935581 U * 1/2018
WO WO-2018225003 A1 * 12/2018 ............. B03D 1/028

OTHER PUBLICATIONS

Yuri A.W. Shardt, Kevin Brooks, Automated System Identification in Mineral Processing Industries: A Case Study using the Zinc Flotation Cell, IFAC-PapersOnLine, vol. 51, Issue 18, (Year: 2018).*

(Continued)

*Primary Examiner* — Charles R Kasenge (57) ABSTRACT

Techniques to facilitate adaptive optimization and control of flotation cell processing are disclosed herein. In at least one implementation, a computing system receives a plurality of flotation cell process variables associated with a flotation cell process. The flotation cell process variables are fed into a machine learning model associated with the flotation cell process to determine improved settings for the flotation cell process. The improved settings for the flotation cell process are provided to an industrial controller that controls at least one aspect of the flotation cell process to improve the flotation cell process.

20 Claims, 6 Drawing Sheets

(56) References Cited

U.S. PATENT DOCUMENTS

| | | | | |
|---|---|---|---|---|
| 2011/0308512 A1* | 12/2011 | Nakasato | ............... | F24S 50/20 |
| | | | | 126/694 |
| 2012/0150507 A1* | 6/2012 | Gallestey | ............ | G05B 13/042 |
| | | | | 703/2 |
| 2013/0306525 A1* | 11/2013 | Kramer | .................. | G05B 13/04 |
| | | | | 209/168 |
| 2013/0341251 A1* | 12/2013 | Blendinger | .......... | B03D 1/1431 |
| | | | | 209/164 |
| 2015/0377683 A1* | 12/2015 | Stirling | ............... | G01F 23/2968 |
| | | | | 73/290 V |
| 2016/0089679 A1* | 3/2016 | Prestes | ................ | B01F 25/4337 |
| | | | | 209/166 |
| 2017/0036219 A1* | 2/2017 | Peasley | .............. | G06K 7/10366 |
| 2020/0132882 A1* | 4/2020 | Runkana | ................ | G06Q 50/02 |
| 2020/0276593 A1* | 9/2020 | Mueller | .............. | B02C 17/1805 |
| 2020/0384506 A1* | 12/2020 | Hunt | .................. | G01N 15/0227 |
| 2021/0048798 A1* | 2/2021 | Bulanda | ................ | G06N 20/00 |

OTHER PUBLICATIONS

Jiang Y, "Data-driven flotation industrial process operational optimal control based on reinforcement learning", May 2018, IEEE, vol. 14, No. 5 (Year: 2018).*

* cited by examiner

ADAPTIVE CONTROL OF INDUSTRIAL AUTOMATION FOR MINING FLOTATION CELLS

TECHNICAL FIELD

Aspects of the disclosure are related to computing hardware and software technology.

TECHNICAL BACKGROUND

Industrial mining operations typically involve many complex systems and processes which are often spread out over various disparate locations. For example, drilling and excavation operations may occur at several different mining sites to extract ore from the earth, which may then be transported to remote mineral processing plants for further processing to recover desired minerals. Several mechanical and chemical techniques may be employed to aid in the recovery of the target minerals.

In industrial mining operations, flotation cells are often employed in a separation process to enhance recovery and concentration of a desired mineral. Typically, the extracted ore is reduced to a fine particulate by crushing and grinding, which is then mixed with water and introduced to a series of tiered banks of interconnected flotation cells for processing. The desired mineral is rendered hydrophobic by the addition of chemical reagents, and the resulting pulp is injected with air and agitated to form bubbles. The hydrophobic particles containing the desired mineral then attach to the bubbles, which rise to the top and collect on the surface. The bubble froth is then removed from the surface of the cell, producing a concentrate of the desired mineral.

Industrial automation mining environments utilize various machines during the mining process, such as drives, motors, valves, compressors, agitators, robots, and other mechanical devices. These devices have various moving parts and other components that are driven by instructions received from industrial controller systems. Machine builders, solution providers, and other content creators typically produce the control logic needed to run on these industrial controller systems in order to control the mechanical functions of the devices and carry out their intended functions.

OVERVIEW

Techniques to facilitate adaptive optimization and control of flotation cell processing are disclosed herein. In at least one implementation, a computing system receives a plurality of flotation cell process variables associated with a flotation cell process. The flotation cell process variables are fed into a machine learning model associated with the flotation cell process to determine improved settings for the flotation cell process. The improved settings for the flotation cell process are provided to an industrial controller that controls at least one aspect of the flotation cell process to improve the flotation cell process.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In industrial mining operations, flotation cells are employed in a separation process to enhance recovery and concentration of a desired mineral. Typically, the extracted ore is reduced to a fine particulate by crushing and grinding, which is then mixed with water and introduced to a series of tiered banks of interconnected flotation cells for processing. The desired mineral is rendered hydrophobic by the addition of chemical reagents, and the resulting pulp is injected with air and agitated to form bubbles. The hydrophobic particles containing the desired mineral then attach to the bubbles, which rise to the top and collect on the surface. The bubble froth is then removed from the surface of the cell, producing a concentrate of the desired mineral.

The nature of the flotation process requires maintaining a high degree of precision in order to maximize recovery. Sharp and sudden changes in the flow input rate can lead to significant losses and a relatively long period of time from which to recover. Flotation processes are naturally unstable and often suffer from equipment degradation and inaccuracies that are continually introduced into the system, especially as components wear down and start to deteriorate. Because flotation cells are typically deployed in a series of interconnected banks, any disturbance that occurs in one cell quickly propagates to neighboring cells. Accordingly, when a disturbance does occur in a particular cell, efforts may be made to isolate the disturbance in order to minimize its propagation and negative impact on the entire system.

The techniques disclosed herein may be utilized to reduce flotation cell disturbances and improve the stability of flotation cell banks. In at least one implementation, a disturbance rejection controller may be enhanced with artificial intelligence that dynamically adapts to changes and disturbances in flotation cells and automatically adjusts parameters, offsets, set points, and other control settings to reduce disturbances and improve recovery and stability of both individual cells and the entire series of cells. By continually receiving and monitoring process variables, predictive and optimization machine learning models may be employed to generate failure and maintenance event predictions and determine optimal settings for a flotation cell process. In some embodiments, the predictions and optimizations generated by the machine learning models may be provided to an industrial controller to implement the optimizations and take preventative measures to ensure the overall stability of the system and reject cell disturbances and propagation.

Figure 1:
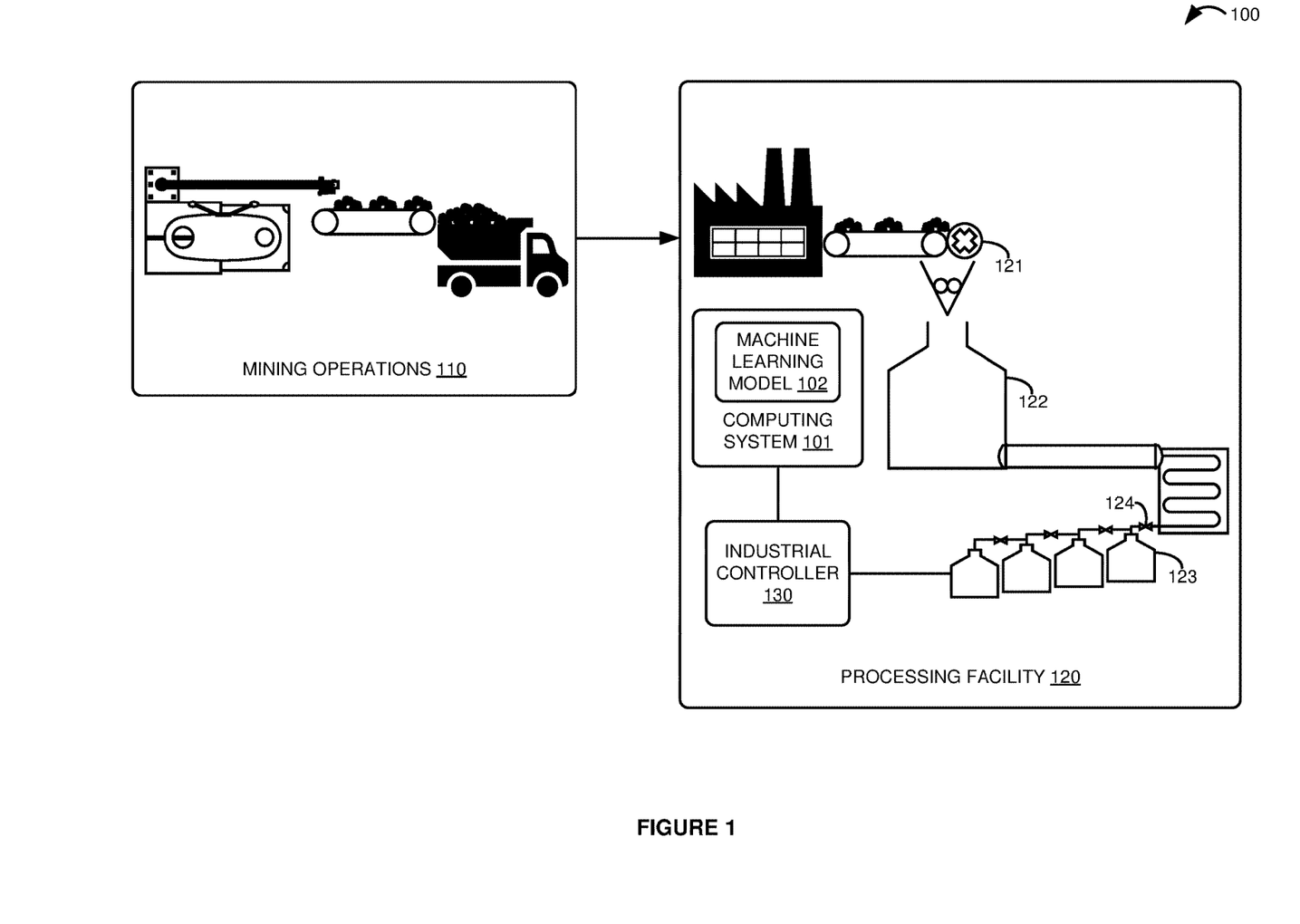
FIG. 1 is a block diagram that illustrates an industrial automation mining environment in an exemplary implementation.
Figure 2:
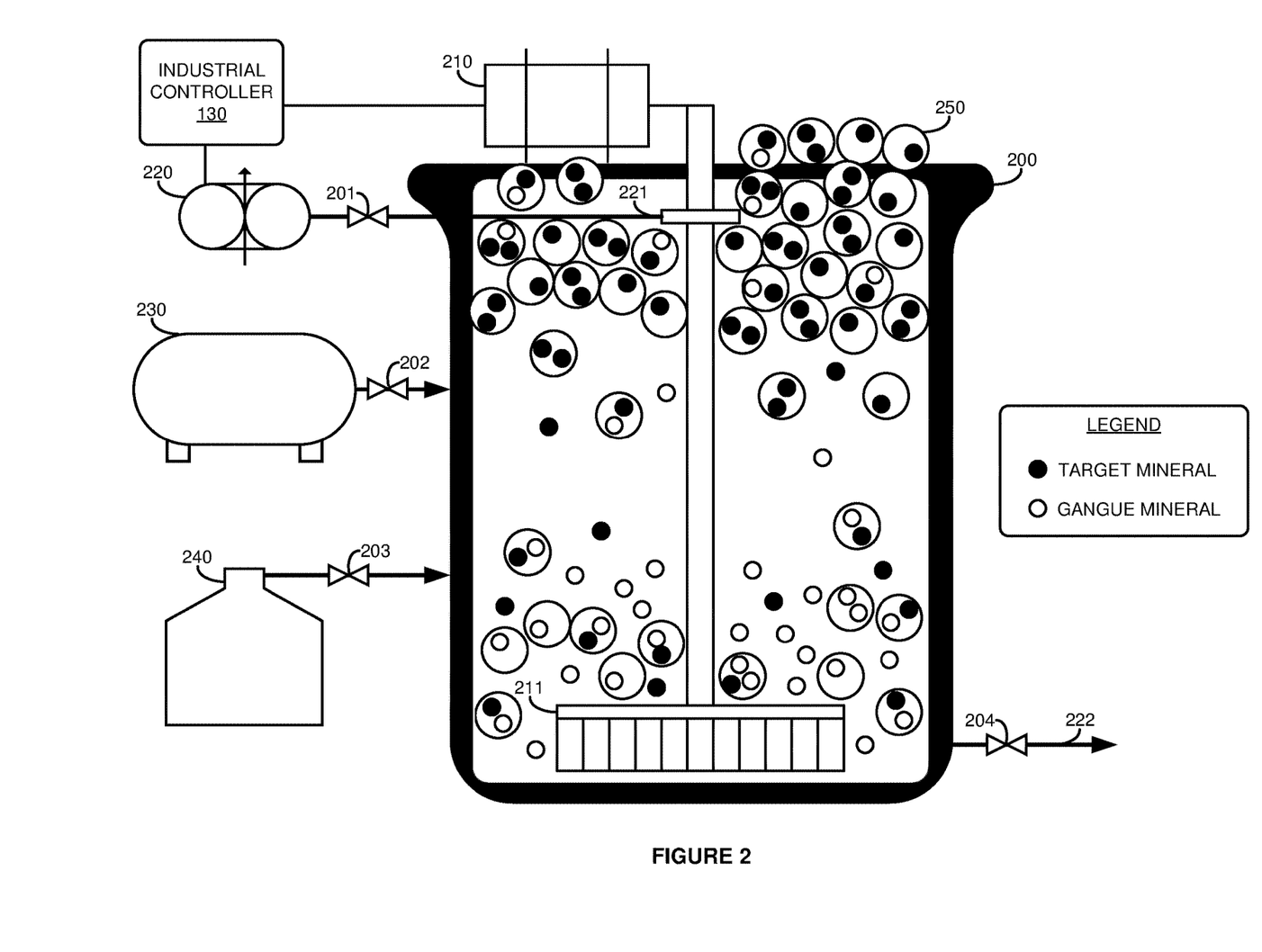
FIG. 2 is a block diagram that illustrates an operation of a flotation cell in an exemplary implementation.
Figure 3:
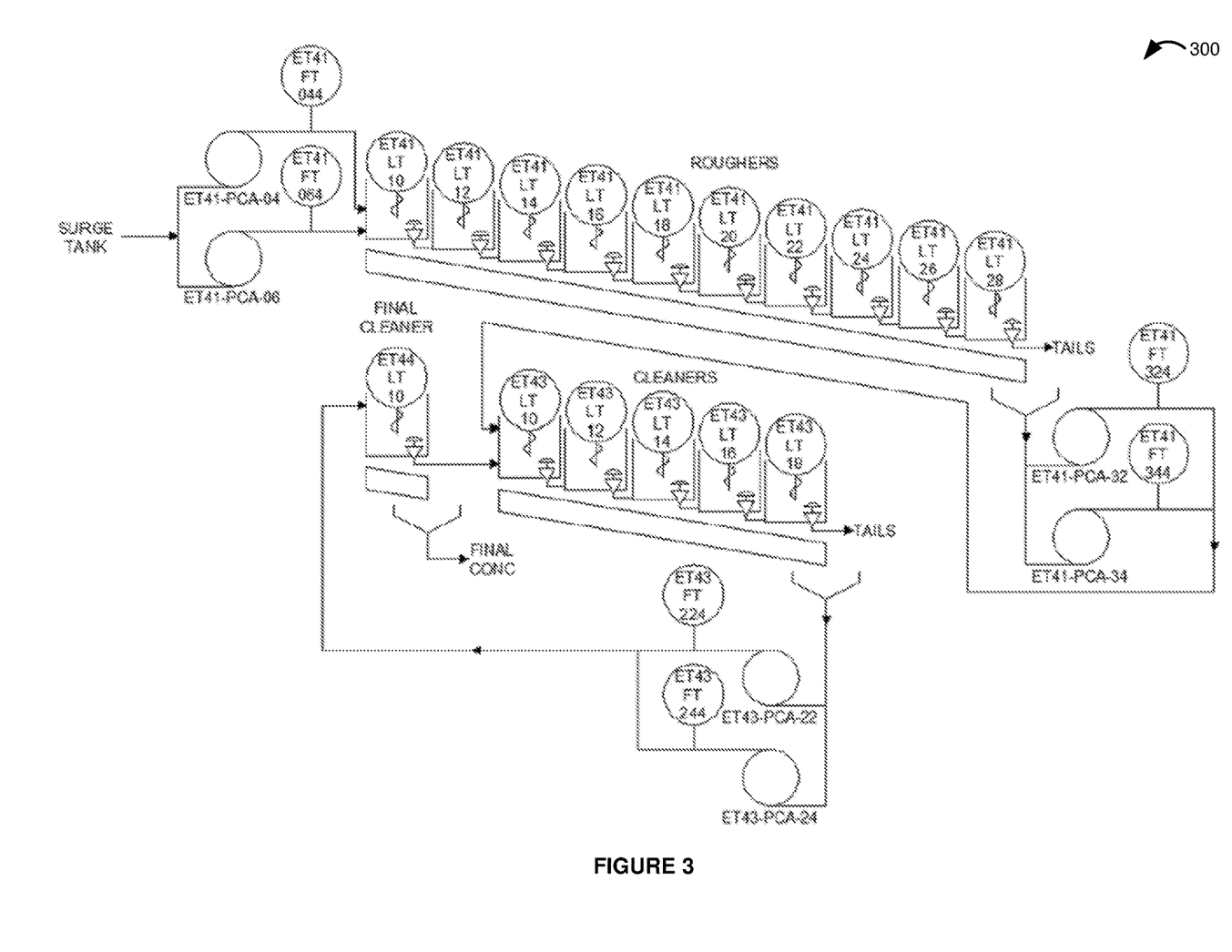
FIG. 3 is a block diagram that illustrates an operation of a series of tiered banks of flotation cells in an exemplary implementation.
Figure 4:
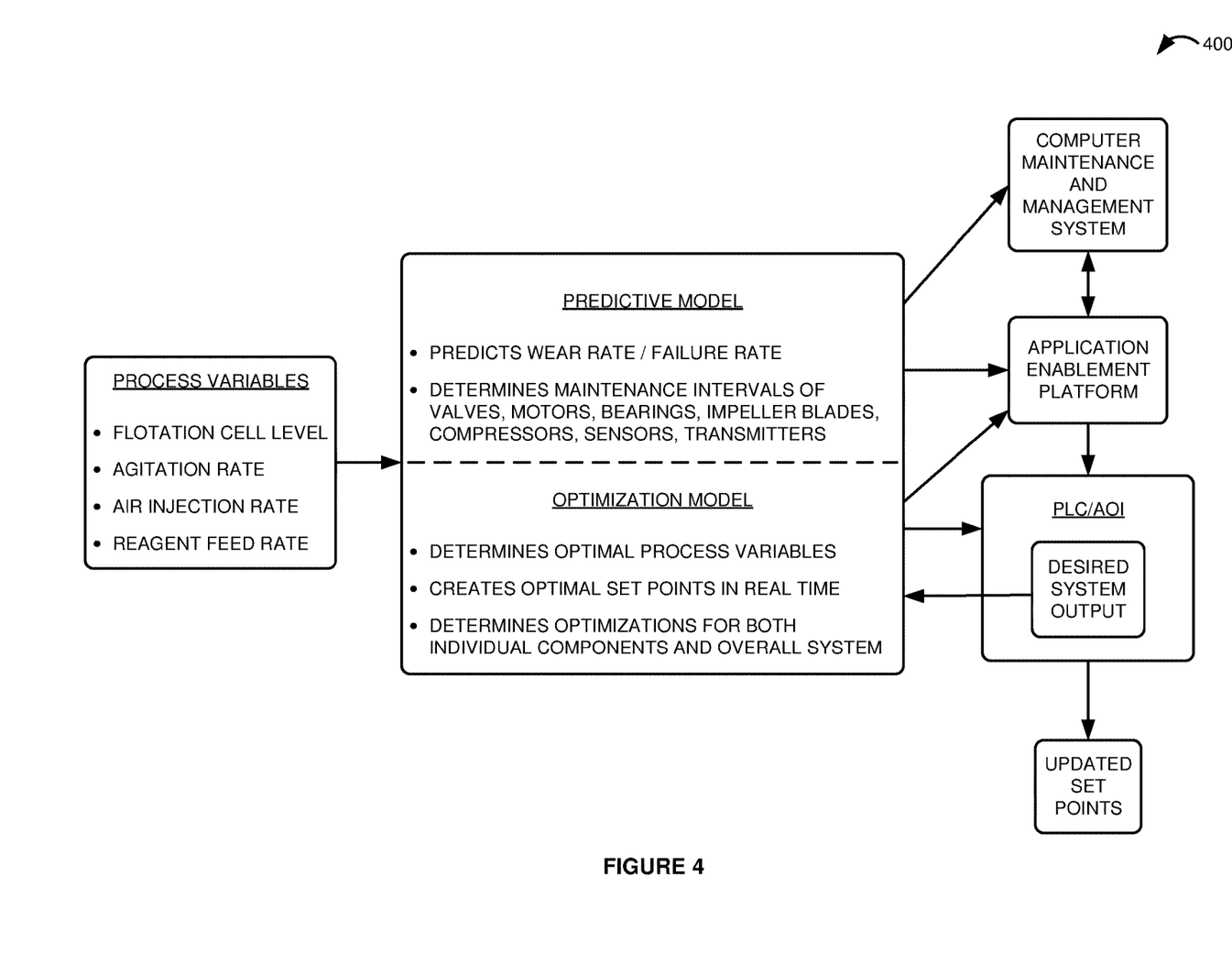
FIG. 4 is a block diagram that illustrates an operation of a predictive and optimization model in an exemplary implementation.
Figure 5:
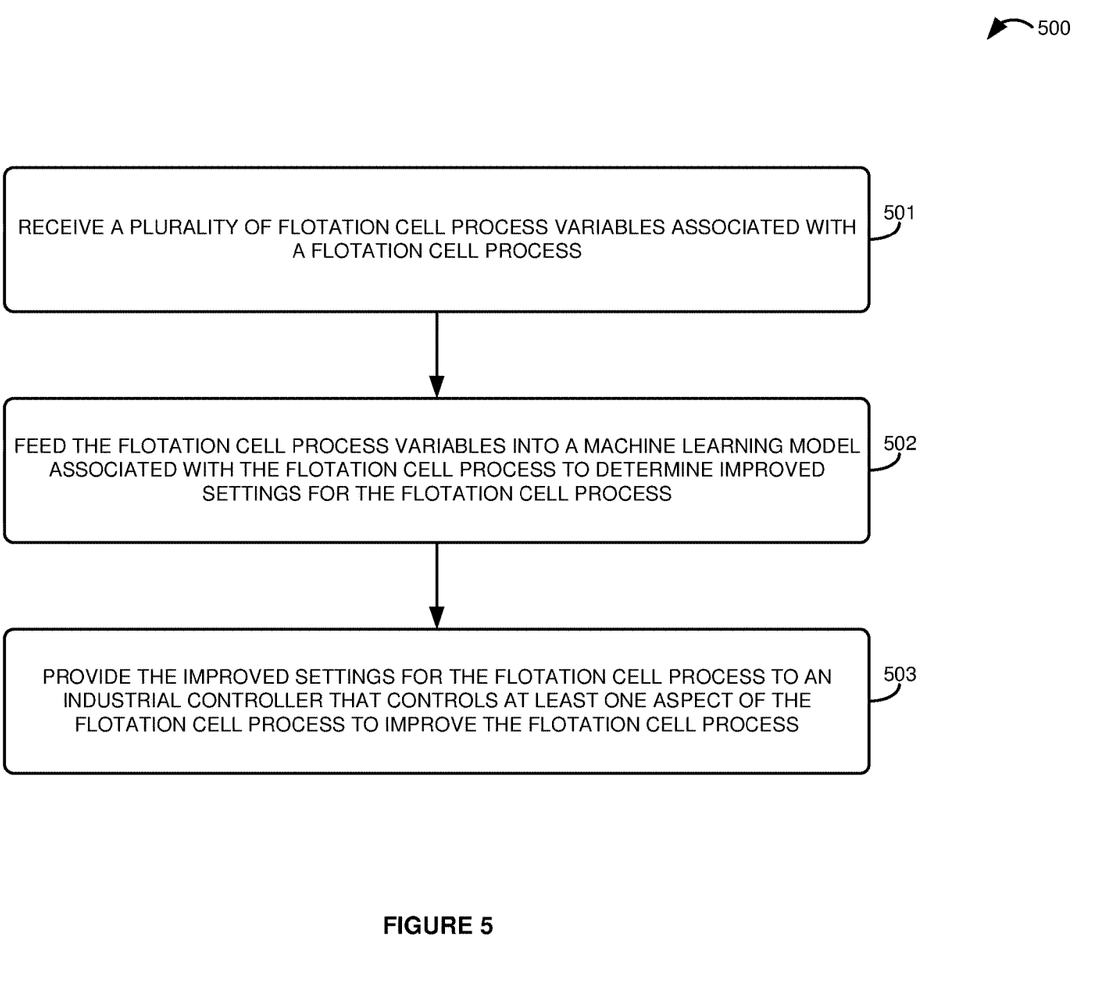
FIG. 5 is a flow diagram that illustrates an operation of a computing system in an exemplary implementation.
Figure 6:
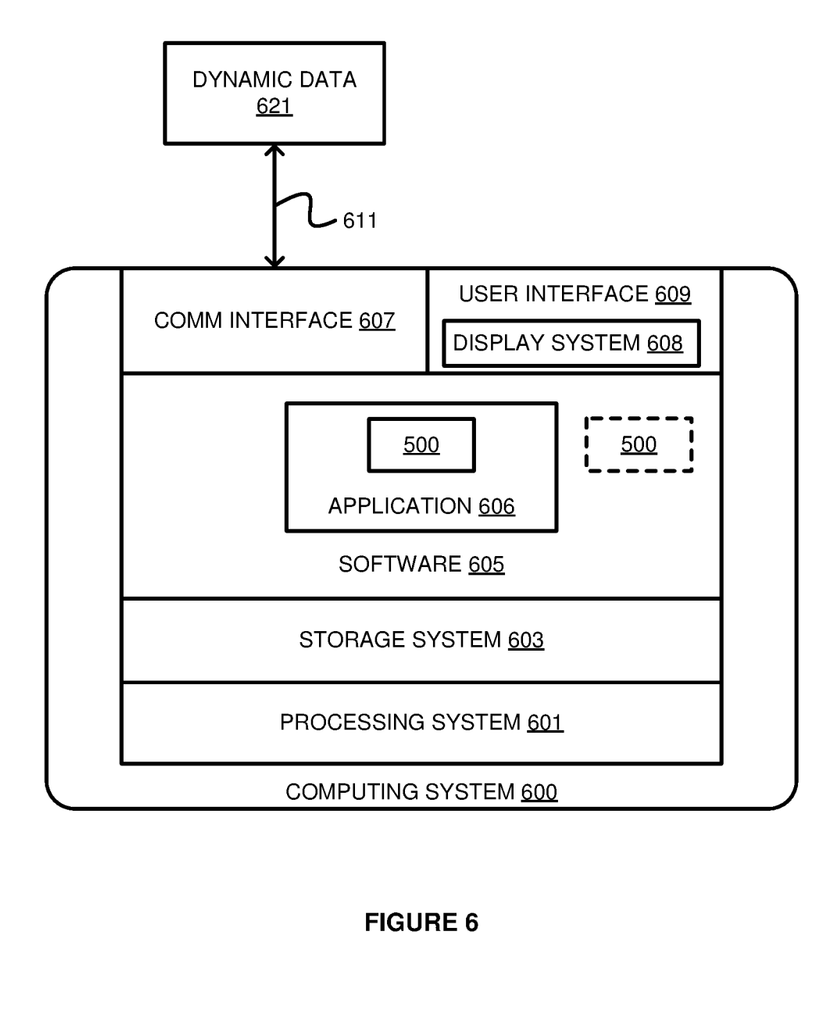
FIG. 6 is a block diagram that illustrates a computing system in an exemplary implementation.

Referring now to the drawings, FIG. 1 illustrates an exemplary industrial automation mining environment that may employ machine learning models to facilitate adaptive optimization and control of flotation cell processing. FIG. 2 is a block diagram that illustrates an operation of a flotation cell, while FIG. 3 is a block diagram that illustrates an operation of a series of tiered banks of flotation cells in exemplary embodiments. FIG. 4 is a block diagram that illustrates an exemplary operational scenario involving a predictive and optimization model to improve flotation cell processing. FIG. 5 is a flow diagram that illustrates an operation to facilitate adaptive optimization and control of flotation cell processing in an exemplary embodiment, and FIG. 6 illustrates an exemplary computing system that may be used to perform any of the flotation cell improvement processes and operational scenarios described herein.

Turning now to FIG. 1, industrial automation mining environment 100 is illustrated in an exemplary embodiment. Industrial automation mining environment 100 includes mining operations 110 and processing facility 120. In this example, processing facility 120 comprises a concentrator plant that employs froth flotation techniques to improve mineral concentrations recovered from extracted ore. Processing facility 120 includes crusher 121, surge tank 122, froth flotation cells 123, and valves 124. In this example, processing facility 120 also includes computing system 101 and industrial controller 130. Computing system 101 includes and executes machine learning model 102. The techniques described below with respect to FIG. 1 could be executed by the systems of industrial automation mining environment 100 such as computing system 101 and industrial controller 130, and could be combined with operation 500 of FIG. 5 in some implementations. Also, although computing system 101 and machine learning model 102 are shown separate from industrial controller 130 in FIG. 1, computing system 101, machine learning model 102, and industrial controller 130 could be combined in some implementations. Similarly, the operations and functionality described herein for computing system 101 and/or machine learning model 102 could instead be performed by industrial controller 130 in some implementations.

In operation, ore is extracted off-site at mining operations 110 and delivered to processing facility 120 at a disparate location for flotation cell processing. The extracted ore is ground into fine particles using crusher 121 so that the material is reduced to physically separate grains. This particulate matter is then mixed with water to form a slurry and contained within surge tank 122. The desired mineral is rendered hydrophobic by the addition of a surfactant or collector chemical reagent. The resulting pulp is then introduced to flotation cells 123 by opening valves 124 which is then injected with air or nitrogen and agitated to form bubbles. The hydrophobic particles containing the desired mineral then attach to the bubbles which rise to the top and collect on the surface as a froth. The froth is then removed from the cell, producing a concentrate of the desired mineral.

Typically, flotation cells 123 are employed in a series of tiered banks, where the initial stages of the flotation cell process employ rougher cells to achieve a rough separation of the minerals, which is then further refined through a series of cleaner cells to achieve a finer reduction and concentration of the target mineral. The minerals that do not float to the surface are referred to as flotation tailings, which are typically transferred to later stages of the flotation process to attempt to recover desired minerals from the tailings that failed to float to the surface in earlier stages.

However, due to the interconnected relationship of flotation cells 123 in a series of tiered banks, it can be very difficult to control the operational parameters and variables of a single cell, because a disturbance in one cell reflects both upstream and downstream. Therefore, one of the goals of flotation cell management is to minimize the overall oscillation, and if a disturbance does occur, to identify and isolate the disturbance as quickly as possible to minimize propagation of the disturbance to surrounding cells. One technique to achieve the stability of the overall system is to maintain stable level control within each individual cell 123, which can be accomplished by monitoring the flow rate of material into and out of each cell 123 and adjusting valves 124 to manage the relationship between cell input and output. Accordingly, in at least one implementation, control and adjustments to both individual components and the overall system may be achieved by feeding the process variables and performance values into machine learning model 102 in order to determine optimal set points, parameters, and other settings for valves 124 and other aspects of the flotation cell system. These set points, parameters, and other values can then be provided to industrial controller 130 for processing to implement the desired changes and control adjustments to various components of the flotation cell system to improve overall system stability and performance optimizations.

Because of their mechanical nature, the various components and subsystems employed in flotation cell mineral processing can exhibit changes in operational characteristics and efficacy over time. For example, the performance of valves 124 typically degrades through continuous use, either due to wear, corrosion, restriction, or blockage from abrasive materials. As components progressively wear down and their performance curve changes, the physical models used to represent the components becomes more inaccurate, since they are generally based on initial, fully-operational performance metrics. Therefore, in order to compensate for performance degradation, the physical models representing various components may be continually adjusted over time, such as by calculating new offsets or other parameters associated with the models. Further, in at least one example, machine learning model 102 could be employed to calculate the offsets and other values needed to adjust the physical models of components used in the system. For example, through the aggregation and analysis of operational data over extended periods of time, machine learning model 102 could determine how the operational characteristics and performance curve of valves 124 and other components change during the course of their useful lifecycle, and then utilize this information to calculate the offsets and adjustments to the physical models of these components, thereby improving the accuracy of the models. Machine learning model 102 can then utilize these more finely-tuned physical models to predict when a component may require maintenance or be reaching the end of its useful life, and determine improvements and optimizations for various control settings and operational parameters of valves 124 and other components employed in flotation cell processing. A more detailed view of an operation of a flotation cell used to separate and further concentrate a desired mineral from extracted ore will now be discussed with respect to FIG. 2.

FIG. 2 is a block diagram that illustrates an operation of a flotation cell 200 in an exemplary implementation. Flotation cell 200 provides an example of a typical flotation cell that may be employed for mineral separation and recovery in a froth flotation process. Flotation cell 200 would commonly be employed as one stage in a series of interconnected cell banks intended to progressively refine and concentrate a desired mineral. The techniques described below with respect to FIG. 2 could be executed by the systems of industrial automation mining environment 100 such as computing system 101 and industrial controller 130, and could be combined with operation 500 of FIG. 5 in some implementations.

In operation, ore is extracted and ground into fine particles, which is then mixed with water to form pulp and stored in storage tank 230. The pulp is then fed into flotation cell 200 for processing. In order to control the level of the mixture in the cell 200, valve 202 may be used to adjust the flow rate and amount of the pulp added to cell 200. The level of pulp within flotation cell 200 may also be controlled using valve 204 on cell outlet 222. Various reagents 240 are also introduced into the mixture, such as collectors, activators, and frothing agents, and the amount of reagents 240 added to cell 200 may be controlled with valve 203.

Once the mixture has the appropriate chemical composition for the desired reactions to take place, air from compressor 220 is injected into cell 200 through air inlet 221, and the amount of air is controlled using valve 201. Once aerated, the mixture is stirred by motor 210 turning agitator 211 to form bubbles 250. Due to the addition of the collector reagent, the desired mineral particles are rendered hydrophobic, causing them to attach to the bubbles 250, which rise to the surface of flotation cell 200 and form a froth. In this example, the legend appearing on FIG. 2 indicates that the target mineral is represented by the solid black dots, and the gangue mineral is represented by the white dots. As shown in flotation cell 200, most of the target mineral has attached to bubbles that have risen to the top of cell 200, and a majority of the gangue mineral has sunk to the bottom. However, note that there are still some gangue mineral particles that remain attached to bubbles 250 that have formed in the froth at the top of cell 200, and there are also some desired mineral particles among the mostly gangue particles that have settled on the bottom. The froth on the top would therefore typically be transferred to another flotation cell for further processing to increase the concentration of the desired mineral, and the tailings on the bottom of cell 200 would also be re-processed in an attempt to recover the remaining desired mineral particles from among the gangue particles.

As indicated above, the various levels of air, pulp, reagents, and tailings within cell 200 may be controlled using valves 201-204, respectively. In this example, industrial controller 130 may be configured to control valves 201-204 appropriately to achieve desired set points, which may be determined using a machine learning model in some implementations. In addition, industrial controller 130 could be used to stop, start, and adjust the speed of motor 210, regulate the air pressure and air flow rate of compressor 220, control the flow rates of pulp from storage tank 230 and reagents 240 entering into cell 200, and the flow rate of tailings exiting out of cell 200 through cell outlet 222. All of the various operational settings and parameters for each of these components, along with optimal set points, could be determined by a machine learning model based on process variables, physical models and empirical performance curves of the components, historical information, and any other relevant data. For example, for the various components employed in the flotation cell process, such as motor 210, agitator 211, compressor 220, and valves 201-204, the machine learning model could utilize physical models of these components along with process variables and other values to dynamically determine offsets to the standard proportional, integral, and derivative (PID) control that will work to achieve a desired relationship between the input and output of flotation cell 200 in order to maintain stable level control of cell 200. Once determined by the machine learning model, the settings, parameters, set points, PID control offsets, and any other control values may be provided automatically to industrial controller 130 and used to control the appropriate components accordingly. In addition, industrial controller 130 could also work with the machine learning model to determine optimal settings for the management and orchestration of an entire series of interconnected flotation cells. An example of a series of flotation cells connected in tiered banks will now be discussed with respect to FIG. 3.

FIG. 3 is a block diagram that illustrates an operation of a series of tiered banks of flotation cells in an exemplary implementation 300. The techniques described below with respect to FIG. 3 could be executed by the systems of industrial automation mining environment 100 such as computing system 101 and industrial controller 130, and could be combined with operation 500 of FIG. 5 in some implementations.

Froth flotation is typically performed in several stages to maximize recovery and concentration of the desired mineral. The series of tiered banks of flotation cells illustrated in FIG. 3 include stages of roughing and cleaning.

The initial roughing stage utilizes a series of tiered banks of rougher cells to produce a rougher concentration of a desired mineral. The primary goal of the roughing stage is to maximize the recovery of coarse grains of the target mineral, with a lower emphasis on the quality of the resulting concentration. In this example, the pulp is provided from a surge tank and processed through a series of rougher cells to achieve this rough separation of the minerals, as shown in FIG. 3.

The secondary cleaning stage is typically applied to the rougher concentrate produced from the roughing stage to remove more of the gangue minerals to further increase the concentration of the target mineral. The goal of the cleaning stage is to produce the highest grade possible of the desired mineral in the final concentration output from the final cleaner cell. In addition, the tailings of both the roughing and the cleaning stages may be further processed through a scavenging stage in attempts to recover any amount of the desired mineral that may remain in the tailings after the initial roughing and cleaning stages.

As discussed herein, a machine learning model may be utilized to predict maintenance events for the various components of the flotation cells employed in the roughing and cleaning stages, and to determine improved settings for these individual components and for the overall master control of the entire flotation cell process. For example, the machine learning model could process operational data associated with the series of tiered rougher cells to determine optimal set points, PID values, and other operational settings to help maintain stable cell levels and achieve other optimizations in the roughing stage. The machine learning model could also determine similar improvements for the operational settings of components employed in the cleaner cells of the cleaning stage, and for the orchestration and optimization of the entire flotation cell process overall. An exemplary operation of a predictive and optimization machine learning model that may be used to improve flotation cell processing will now be discussed with respect to FIG. 4.

FIG. 4 is a block diagram that illustrates an operation of a predictive and optimization model in an exemplary implementation 400. The techniques described below with respect to FIG. 4 could be executed by the systems of industrial automation mining environment 100 such as computing system 101 and industrial controller 130, and could be combined with operation 500 of FIG. 5 in some implementations.

In this example, process variables associated with flotation cell processing are fed into a predictive model and an optimization model that utilize machine learning techniques to predict maintenance events and determine optimal process variables, set points, offsets, and other operational settings. The values determined by the predictive and optimization machine learning models are then provided to various control systems in order to take action on the predictions and implement the optimizations, thereby improving the flotation cell processing.

In operation, process variables associated with flotation cell processing are provided to both the predictive model and the optimization model. In this example, the process variables include flotation cell level, agitation rate, air injection rate, and reagent feed rate. Note that additional process variables could also be used in other examples, including flow rates into and out of the flotation cell, motor speed, air pressure, vibration indicators, valve tolerances, performance curves, and any other operational data.

The predictive model comprises a machine learning model trained on the operation of flotation cells and utilizes physical models of the various components in order to analyze the process variables and make predictions regarding the components employed in flotation cell processing. For example, the predictive model can predict wear rates and failure rates of individual parts and components that are utilized in flotation cells. The predictive model may also analyze the process variables using machine learning techniques to predict maintenance events or determine maintenance intervals for various components, such as valves, motors, drives, bearings, impeller blades, compressors, sensors, transmitters, and any other components. Further, in at least one implementation, the predictive model may also generate fault detection diagnostics for valves, level transmitters, flow transmitters, pH levels, and any other components or metrics, which can be used for improved fault predictions and preventative maintenance.

The predictions generated by the predictive model may be provided to a computer maintenance and management system (CMMS) and/or an application enablement platform (AEP) in order to take action on the predictions and schedule preventative maintenance events when appropriate to help provide continuous system operation and minimize downtime. In at least one implementation, the predictive model may utilize an application programming interface (API) to communicate the maintenance event predictions to the CMMS, which could analyze the predictions and responsively take various actions, such as generating work orders, scheduling preventative maintenance and planned downtime, generating alarms and other notification events, conducting asset management tasks such as asset logging and asset planning, and any other actions. Additionally, in some implementations the CMMS may interact with the AEP in order to achieve some or all of this functionality. For example, events may occur that could cause the CMMS to contact the AEP to transfer control instructions such as an add-on instruction (AOI), user-defined data type (UDT) instruction, or some other logic program code to the programmable logic controller (PLC), which would process the control instructions and perform the corresponding functions. In this manner, output from the predictive model related to individual components that are utilized in flotation cells, such as upcoming maintenance events, recommended maintenance intervals, and other predictions may be communicated to the CMMS and/or the AEP and which can responsively instruct the PLC to take appropriate action.

Similarly, the optimization model also utilizes the machine learning model trained on the operation of flotation cells along with the physical models of various components in order to analyze the process variables and determine optimizations for those components. In some implementations, the optimization model could utilize the machine learning model along with the physical models representing the various components to determine more efficient and optimal settings for the process variables. For example, the optimization model could automatically determine optimizations for flotation cell level, agitation rate, air injection rate, and reagent feed rate for each individual cell in a flotation cell system. In some examples, the optimizations determined by the optimization model could include energy optimizations that minimize the amount of energy used by each component or process, optimizations for the timing and synchronization of the system and various subsystems, optimizations to reduce the amount of reagent chemicals and other resources that are used and to increase the amount of desired minerals that are recovered, and optimizations for the overall process throughput. The optimization model may also dynamically create optimal set points in real time, and can determine these and other optimizations for both individual components and the overall system. The updated set points determined by the optimization model may be provided to the PLC, which can then execute code to take action and make changes to update the set points for the various components as directed by the optimization model.

In at least one implementation, the PLC provides the desired system output to the optimization model, which may then be used as a basis for determining optimized settings for process variables, updated set points, PID offsets, and any other system optimizations. For example, the PLC could operate in a closed-loop with the optimization model, where empirical performance curves may be provided from the optimization model to the PLC in the form of AOI or UDT instructions, and the desired or ideal system output is provided back to the optimization model by the PLC. This bidirectional communication that exists between the PLC and the optimization model enables dynamic updates to component performance curve models, allowing for the machine learning aspect of the optimization model to make adjustments to the performance curves empirically and compensate for changes or declines in performance over time. The optimization model can determine optimizations for both individual components and the overall system, which may require multiple different optimization models working together collectively. For example, the optimization model could comprise several individual machine learning models that are each individually trained on separate components of a flotation cell system, and one master machine learning model that operates to optimize and orchestrate the entire flotation cell process from start to finish. In this manner, flotation cell processing can be optimized for maximum efficiency and increased concentration and recovery of a target mineral. An exemplary operation to facilitate adaptive optimization and control of flotation cell processing will now be described in greater detail with respect to FIG. 5.

FIG. 5 is a flow diagram that illustrates an operation 500 of a computing system in an exemplary implementation. The operation 500 shown in FIG. 5 may also be referred to as flotation cell improvement process 500 herein. The steps of the operation are indicated below parenthetically. The following discussion of operation 500 will proceed with reference to computing system 101, machine learning model 102, and industrial controller 130 of FIG. 1 in order to illustrate its operations, but note that the details provided in FIG. 1 are merely exemplary and not intended to limit the scope of process 500 to the specific implementation shown in FIG. 1. Further, some or all of operation 500 and other functionality described herein for computing system 101 and/or machine learning model 102 could instead be performed by industrial controller 130 in some implementations.

Operation 500 may be employed to operate computing system 101 to facilitate adaptive optimization and control of flotation cell processing. As shown in the operational flow of process 500, computing system 101 receives a plurality of flotation cell process variables associated with a flotation cell process (501). In some examples, the flotation cell process variables could comprise any operational settings, performance metrics, sensor data, empirical curves, set points, PID values, offsets, or any other operational data associated with the flotation cell process. In at least one implementation, the flotation cell process variables comprise flotation cell level, agitation rate, air injection rate, and reagent feed rate. Note that additional process variables could also be used in other examples, including flow rates into and out of flotation cells, motor speeds, air pressures, vibration metrics, valve tolerances, and any other operational settings or status metrics.

Computing system 101 feeds the flotation cell process variables into machine learning model 102 associated with the flotation cell process to determine improved settings for the flotation cell process (502). Machine learning model 102 analyzes the flotation cell process variables to determine the improved settings for the flotation cell process. In some examples, computing system 101 could provide the process variables to machine learning model 102 to determine the improved settings for individual components employed in the flotation cell process and for overall master control of the flotation cell process. In at least one implementation, machine learning model 102 is trained on the operation of flotation cells along with physical models of various components employed in the process in order to analyze the process variables and determine the improved settings for the process variables associated with those components. For example, machine learning model 102 could employ the physical models and empirical curves representing the operational characteristics of various components to determine more efficient and improved settings for the process variables. In some implementations, machine learning model 102 could automatically determine the improved settings for flotation cell level, agitation rate, air injection rate, and reagent feed rate for each individual cell in the flotation cell process. In some examples, the improved settings determined by machine learning model 102 could include energy improvements that reduce the amount of energy used by each component or process, improved timing and synchronization of the system and various subsystems and components, improved settings to reduce the amount of reagent chemicals and other resources that are used and to increase the amount of desired minerals that are recovered, and improvements in the overall process throughput.

In some implementations, the improved settings for the flotation cell process may comprise an updated set point associated with the flotation cell process. For example, in at least one implementation, machine learning model 102 could dynamically create updated set points in real time in order to achieve desired system output, and can determine these set points and other improvements for both individual components and the overall system. The desired system output may be provided to machine learning model 102 by industrial controller 130 in some examples. Further, in some implementations, the improved settings for the flotation cell process could comprise an updated offset to a proportional, integral, and derivative (PID) control associated with the flotation cell process. For example, if a disturbance occurs in a particular flotation cell that causes the cell level to dip below threshold tolerance levels, a change to the PID control could be determined dynamically by machine learning model 102 and updated in real time to adjust for the disturbance and balance the relationship between the flow rate of material into and out of the cell. Moreover, in some implementations, there could be several PID controls for each industrial asset and component employed in the flotation cell process, and machine learning model 102 could determine improved settings for any or all of these PID controls to provide adaptive control of the flotation cell process.

In some examples, machine learning model 102 could also be adjusted dynamically to compensate for changes in performance over time. For example, because of their mechanical nature, the various components and subsystems employed in flotation cell processing can exhibit continual changes in operational characteristics and efficacy throughout their lifetime. As components progressively wear down and their performance curve changes, the physical models and performance curves used to represent the components in machine learning model 102 becomes more inaccurate. Therefore, in order to compensate for performance degradation, the physical models representing various components may be continually adjusted over time, such as by calculating new offsets or other parameters associated with the models. In some examples, machine learning model 102 could be employed to calculate the offsets and other values needed to adjust the physical models in machine learning model 102 that represent the various components used in the flotation cell process. For example, in at least one implementation, computing system 101 could provide updated process variables to machine learning model 102 that indicate a change in performance associated with the flotation cell process, and machine learning model 102 could be configured to automatically adjust machine learning model 102 to compensate for the change in performance. In this example, the change in performance associated with the flotation cell process could comprise any variation in operational characteristics or deviation in the performance curve model of components used in the flotation cell process that may be analyzed to determine adjustments for machine learning model 102 to compensate for the change in performance. In some implementations, machine learning model 102 could include a dynamic model established for each flotation cell used in the flotation cell process, which may be continually updated by utilizing the self-learning capabilities of machine learning model 102 in order to provide adaptive control that compensates for deteriorating valve performance and other variations caused by performance degradation of various components.

In addition, some implementations provide for virtual sensing of various characteristics, such as bubble size, velocity, and color. For example, physical properties of bubbles can be very difficult to monitor and measure, so machine learning model 102 could be configured with a flow type of model such as a laminar flow model and trained with enough mechanics of the flotation cell system to estimate the size, velocity, and color of bubbles. Similarly, machine learning model 102 could be configured to virtually sense flow rates, mass balance, and other physical characteristics of the flotation cell process. Instrumentation lag may also be incorporated into the control. Further, in at least one implementation, fault detection diagnostics could be provided for valves, level transmitters, flow transmitters, pH levels, and any other components or metrics, which can be used for improved fault predictions and preventative maintenance recommendations. Additionally, in some implementations, machine learning model 102 may be configured to generate different simulations with various adjusted parameters, and computing system 101 may provide data reports and visualizations that indicate the effect of applying the adjusted parameters, such as showing the efficiency gains that may result from applying the improved settings for the flotation cell process.

Computing system 101 provides the improved settings for the flotation cell process to industrial controller 130 that controls at least one aspect of the flotation cell process to improve the flotation cell process (503). For example, in at least one implementation, industrial controller 130 could comprise a programmable logic controller (PLC) that controls valves, motors, compressors, cell levels, agitation rates, air injection rates, reagent feed rates, and any other aspects of the flotation cell process. The improved settings determined by machine learning model 102 may be provided by computing system 101 to industrial controller 130, which can then execute logic code to take action and make changes to apply the improved settings for the various components as directed by machine learning model 102. For example, when the improved settings comprise updated set points or PID control values, industrial controller 130 could be configured to implement and apply the updated set points, PID control values, and any other improved settings for the flotation cell process.

Advantageously, computing system 101 utilizes machine learning model 102 to determine improved settings for the flotation cell process. By collecting and analyzing flotation cell process variables with machine learning model 102, computing system 101 may continuously determine dynamic adjustments to various components employed in the flotation cell process. In this manner, flotation cell processing can be improved for better operational efficiency and increased concentration and recovery of a target mineral.

Now referring back to FIG. 1, computing system 101 comprises a processing system and communication transceiver. Computing system 101 may also include other components such as a user interface, data storage system, and power supply. Computing system 101 may reside in a single device or may be distributed across multiple devices, including other systems within industrial automation environment 100 or an automation control system. For example, industrial controller 130 could be included within computing system 101 in some implementations. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network. In some examples, computing system 101 could comprise a ControlLogix® control system provided by Rockwell Automation, Inc.

Industrial controller 130 generally comprises a processing system and communication transceiver. Industrial controller 130 may reside in a single device or may be distributed across multiple devices. Industrial controller 130 may be a discrete system or may be integrated within other systems, including other systems within industrial automation environment 100 or an automation control system. For example, computing system 101 and/or machine learning model 102 could be included within industrial controller 130 in some implementations. In some examples, industrial controller 130 could comprise automation controllers, programmable logic controllers (PLCs), programmable automation controllers (PACs), or any other controllers used in automation control. In some implementations, a PLC, PAC, and/or specific modules within a PLC rack could provide some or all of the functionality described herein for industrial controller 130. In some examples, industrial controller 130 could comprise a ControlLogix® control system provided by Rockwell Automation, Inc.

Turning now to FIG. 6, a block diagram is shown that illustrates computing system 600 in an exemplary implementation. Computing system 600 provides an example of computing system 101, industrial controller 130, or any computing system that may be used to execute flotation cell improvement process 500 or variations thereof, although computing system 101 and industrial controller 130 could use alternative configurations. Computing system 600 includes processing system 601, storage system 603, software 605, communication interface 607, and user interface 609. User interface 609 comprises display system 608. Software 605 includes application 606 which itself includes flotation cell improvement process 500. Flotation cell improvement process 500 may optionally be implemented separately from application 606, as indicated by the dashed line in FIG. 6.

Computing system 600 may be representative of any computing apparatus, system, or systems on which application 606 and flotation cell improvement process 500 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for flotation cell improvement process 500 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 609, processing system 601 may load and execute portions of software 605, such as flotation cell improvement process 500, to render a graphical user interface for application 606 for display by display system 608 of user interface 609. Software 605 may be implemented in program instructions and among other functions may, when executed by computing system 600 in general or processing system 601 in particular, direct computing system 600 or processing system 601 to receive a plurality of flotation cell process variables associated with a flotation cell process. Software 605 may further direct computing system 600 or processing system 601 to feed the flotation cell process variables into a machine learning model associated with the flotation cell process to determine improved settings for the flotation cell process. In addition, software 605 directs computing system 600 or processing system 601 to provide the improved settings for the flotation cell process to an industrial controller that controls at least one aspect of the flotation cell process to improve the flotation cell process.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate adaptive optimization and control of flotation cell processing as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or flotation cell improvement process 500 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as display system 608, speakers, haptic devices, and other types of output devices may also be included in user interface 609. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more non-transitory computer-readable storage media having program instructions stored thereon to facilitate adaptive optimization and control of flotation cell processing, wherein the program instructions, when executed by a computing system, direct the computing system to at least:

receive a plurality of flotation cell process variables associated with a flotation cell process;

receive a desired system output for the flotation cell process from an industrial controller that controls at least one aspect of the flotation cell process;

input the plurality of flotation cell process variables and the desired system output to a machine learning model, wherein the machine learning model is trained to:

process the plurality of flotation cell process variables to determine improved settings for the flotation cell process and a change in performance of at least one component of a plurality of components associated with the flotation cell process based on the input; and responsively generate the improved settings for the flotation cell process wherein the improved settings comprise an adjustment to a performance curve for the at least one component based on the change in performance of the at least one component;

provide the improved settings for the flotation cell process to the industrial controller; and in response to receiving the improved settings, applying, by the industrial controller, the improved settings, including the adjustment to the performance curve for the at least one component, to achieve the desired system output for the at least one aspect of the flotation cell process.

2. The one or more non-transitory computer-readable storage media of claim 1 wherein the program instructions direct the computing system to determine the improved settings for the flotation cell process by directing the computing system to determine the improved settings for individual components of the plurality of components associated with the flotation cell process.

3. The one or more non-transitory computer-readable storage media of claim 1 wherein the program instructions direct the computing system to determine the improved settings for the flotation cell process by directing the computing system to determine the improved settings for overall master control of the flotation cell process.

4. The one or more non-transitory computer-readable storage media of claim 1 wherein the improved settings for the flotation cell process comprise updated set points for one or more components of the plurality of components associated with the flotation cell process and an updated offset to a Proportional, Integral, and Derivative (PID) control device associated with the flotation cell process.

5. The one or more non-transitory computer-readable storage media of claim 1 wherein the improved settings for the flotation cell process comprise energy optimizations that minimize an amount of energy used by one or more components of the plurality of components associated with the flotation cell process.

6. The one or more non-transitory computer-readable storage media of claim 1 wherein the program instructions direct the computing system to provide updated process variables to the machine learning model that indicate a change in performance associated with the flotation cell process, and wherein the machine learning model is configured to automatically adjust the machine learning model to compensate for the change in performance.

7. The one or more non-transitory computer-readable storage media of claim 1 wherein the flotation cell process variables comprise flotation cell level, agitation rate, air injection rate, and reagent feed rate.

8. A method to facilitate adaptive optimization and control of flotation cell processing, the method comprising:

receiving a plurality of flotation cell process variables associated with a flotation cell process;

receiving a desired system output for the flotation cell process from an industrial controller that controls at least one aspect of the flotation cell process;

inputting the plurality of flotation cell process variables and the desired system output to a machine learning model, wherein the machine learning model is trained to:

process the plurality of flotation cell process variables to determine improved settings for the flotation cell process and a change in performance of at least one component of a plurality of components associated with the flotation cell process based on the input; and responsively generate the improved settings for the flotation cell process wherein the improved settings comprise an adjustment to a performance curve for the at least one component based on the change in performance of the at least one component;

providing the improved settings for the flotation cell process to the industrial controller; and in response to receiving the improved settings, implementing, by the industrial controller, the improved settings, including the adjustment to the performance curve for the at least one component, to achieve the desired system output for the at least one aspect of the flotation cell process.

9. The method of claim 8 wherein feeding the flotation cell process variables into the machine learning model to determine the improved settings for the flotation cell process comprises feeding the flotation cell process variables into the machine learning model to determine the improved settings for individual components of the plurality of components associated with the flotation cell process.

10. The method of claim 8 wherein feeding the flotation cell process variables into the machine learning model to determine the improved settings for the flotation cell process comprises feeding the flotation cell process variables into the machine learning model to determine the improved settings for overall master control of the flotation cell process.

11. The method of claim 8 wherein the improved settings for the flotation cell process comprise updated set points for one or more components of the plurality of components associated with the flotation cell process and an updated offset to a Proportional, Integral, and Derivative (PID) control device associated with the flotation cell process.

12. The method of claim 8 wherein the improved settings for the flotation cell process comprise energy optimizations that minimize an amount of energy used by one or more components of the plurality of components associated with the flotation cell process.

13. The method of claim 8 further comprising providing updated process variables to the machine learning model that indicate a change in performance associated with the flotation cell process, and wherein the machine learning model is configured to automatically adjust the machine learning model to compensate for the change in performance.

14. The method of claim 8 wherein the flotation cell process variables comprise flotation cell level, agitation rate, air injection rate, and reagent feed rate.

15. A system to facilitate adaptive optimization and control of flotation cell processing, the system comprising:

a computing device comprising a processing system, one or more computer-readable storage media, and program instructions stored on the one or more computer-readable storage media that, when executed by the processing system, direct the processing system to at least:

receive a plurality of flotation cell process variables associated with a flotation cell process;

receive a desired system output for the flotation cell process from an industrial controller that controls at least one aspect of the flotation cell process;

input the plurality of flotation cell process variables and the desired system output to a machine learning model, wherein the machine learning model is trained to:

process the plurality of flotation cell process variables to determine improved settings for the flotation cell process and a change in performance of at least one component of a plurality of components associated with the flotation cell process based on the input; and responsively generate the improved settings for the flotation cell process wherein the improved settings comprise an adjustment to a performance curve for the at least one component based on the change in performance of the at least one component;

provide the improved settings for the flotation cell process to the industrial controller; and the industrial controller comprising a processor, a memory, and instructions stored on the memory that, upon execution by the processor, cause the processor to:

in response to receiving the improved settings, apply the improved settings, including the adjustment to the performance curve for the at least one component, to achieve the desired system output for the at least one aspect of the flotation cell process.

16. The system of claim 15 wherein the program instructions direct the processing system to determine the improved settings for the flotation cell process by directing the processing system to determine the improved settings for individual components of the plurality of components associated with the flotation cell process.

17. The system of claim 15 wherein the program instructions direct the processing system to determine the improved settings for the flotation cell process by directing the processing system to determine the improved settings for overall master control of the flotation cell process.

18. The system of claim 15 wherein the improved settings for the flotation cell process comprise updated set points for one or more components of the plurality of components associated with the flotation cell process and an updated offset to a Proportional, Integral, and Derivative (PID) control device associated with the flotation cell process.

19. The system of claim 15 wherein the improved settings for the flotation cell process comprise energy optimizations that minimize an amount of energy used by one or more components of the plurality of components associated with the flotation cell process.

20. The system of claim 15 wherein the program instructions direct the processing system to provide updated process variables to the machine learning model that indicate a change in performance associated with the flotation cell process, and wherein the machine learning model is configured to automatically adjust the machine learning model to compensate for the change in performance.

* * * * *